US012796663B2

(12) United States Patent
Dewhurst et al.

(10) Patent No.: US 12,796,663 B2
(45) Date of Patent: Nov. 17, 2026

(54) RETRIEVAL LINE FOR FIXED GEAR AND METHOD OF RETRIEVING FIXED GEAR

(71) Applicant: Kelson Marine Co., Portland, ME (US)

(72) Inventors: Tobias Dewhurst, Scarborough, ME (US); William Ntsoane, Portland, ME (US); Zachary Moscicki, South Portland, ME (US); Douglas Slocum, Cumberland, ME (US)

(73) Assignee: Kelson Marine Co., Portland, ME (US)

( * ) Notice: Subject to any disclaimer, the term of this patent is extended or adjusted under 35 U.S.C. 154(b) by 0 days.

(21) Appl. No.: 18/426,756

(22) Filed: Jan. 30, 2024

(65) Prior Publication Data

US 2024/0251769 A1 Aug. 1, 2024

Related U.S. Application Data

(60) Provisional application No. 63/482,101, filed on Jan. 30, 2023.

(51) Int. Cl.
*A01K 69/08* (2006.01)
*D07B 1/00* (2006.01)

(52) U.S. Cl.
CPC .............. *A01K 69/08* (2013.01); *D07B 1/005* (2013.01)

(58) Field of Classification Search
CPC .... A01K 69/08; D07B 1/005; D07B 2205/00; D07B 2205/30; D07B 2205/3003; D07B 2005/3007
USPC ........................................................ 428/299.4
See application file for complete search history.

(56) References Cited

U.S. PATENT DOCUMENTS

2024/0227985 A1* 7/2024 Robertson ........... F03B 13/1885

* cited by examiner

*Primary Examiner* — Camie S Thompson

(57) ABSTRACT

The invention is directed towards a retrieval line that is adapted to help users retrieve gear from the floor of a water body, such as commercial fishing traps on the ocean floor, and that is configured to reduce the risks of damaging entanglements with marine life.

15 Claims, 4 Drawing Sheets

Cross Section View

RETRIEVAL LINE FOR FIXED GEAR AND METHOD OF RETRIEVING FIXED GEAR

BACKGROUND INFORMATION

Field of the Invention

This invention relates to the retrieval of items in a water body, and in particular devices and methods for retrieving fishing gear and other equipment fixed on the floor of a water body.

Discussion of Prior Art

Many objects need to be retrieved from bodies of water. For example, many commercial fishing industries target bottom dwelling creatures, such as lobsters and other crustaceans. Often, weighted box-shaped traps, which are usually connected in series, are attached to a groundline, which is connected by another long rope, which is commonly made of a synthetic or natural material, that is in turn shackled or tied to a floatation buoy at the surface. Fishing crews on a boat access the buoy to access the line and retrieve the traps.

This method of retrieval is effective, both in terms of cost and practicalities, but has faced increasing scrutiny and limitations due to the ability of these retrieval lines to entangle marine animals, especially the North Atlantic Right Whale.

Efforts to reconcile the economic importance of pot fisheries with the survival of endangered whale species have led to the development and promotion of several novel ropeless gear inventions, which generally rely on lobster traps connected to remotely activated tethered floats restrained at the sea bottom that when triggered expand or are released causing rapid ascend to the surface. Activation is triggered via electronic or acoustic signals. Once at the surface, the buoy is retrieved and the attached line is hauled bringing the seafloor based gear with it to the surface.

Commonalities across ropeless fishing gears include use of electronics and space-based navigation services. The reliability and economics of ropeless fishing gear is a subject of investigation, though initial studies suggest incompatibility with small lobstering operations. Additionally, the incorporation of "breakaway links" has been promoted by regulators. These chain-shaped links are designed to break at a tensile load theoretically calibrated to promote release of an animal during an entanglement event. There are also concerns from lobster harvesters about the reliability of these links in storms or otherwise rough seas, as well as false breakages resulting from boat entanglement or tensile forces on heavily loaded retrieval lines, which may have more than 40 traps attached at once.

What is needed, therefore, is a device and method of trap retrieval that limits bycatch and entanglement that is cost-effective and reliable.

BRIEF SUMMARY OF THE INVENTION

The invention is a semi-rigid retrieval line made from fiber reinforced plastic generally comprised of stiff fibers and related method of trap retrieval. The stiff fibers may take a number of forms, such as, for example, glass, aramid, and/or carbon, and which may be non-uniformly distributed to achieve the desired combination of tensile and bending strength, and a binding resin. The resulting semi-rigid retrieval line, a "composite line", features bending stiffnesses much higher than fiber ropes, an inability to form knots, and failure in bending within a specified curvature.

The composite line may be vertically oriented and attached to a surface buoy and long enough to nearly reach the seafloor, i.e. the composite line ideally terminating at least 2 meters above the seafloor to prevent abrasion with seafloor sediments. The composite vertical line has a termination fitted on either end. A synthetic fiber ground line may be attached at the bottom end, to which standard fishing traps are attached. To maintain floatation and visibility from the surface, standard buoys may be used.

The method of trap retrieval includes the utilization of a number of accessories needed for bringing the loaded traps aboard a boat. In general, a mechanically actuated winch with a large diameter drum allows for controlled coiling and uncoiling of the composite line. This winch is fitted with an outer cage surrounding the drum that restricts unwanted uncoiling of lines when tension on the coiled line is released. To mitigate the likelihood of bending stresses that may trigger mechanical failure during hauling and deployment, a variety of fairlead systems may be utilized to handle the line between the water and mechanical winch system. To ensure a clean fracture in the event of a marine mammal interaction, a series of specially engineered rigid disks may be attached to the composite line.

BRIEF DESCRIPTION OF THE DRAWINGS

The present invention is described with reference to the accompanying drawings. In the drawings, like reference numbers indicate identical or functionally similar elements. The drawings are not drawn to scale.

DETAILED DESCRIPTION OF THE INVENTION

Figure 1:
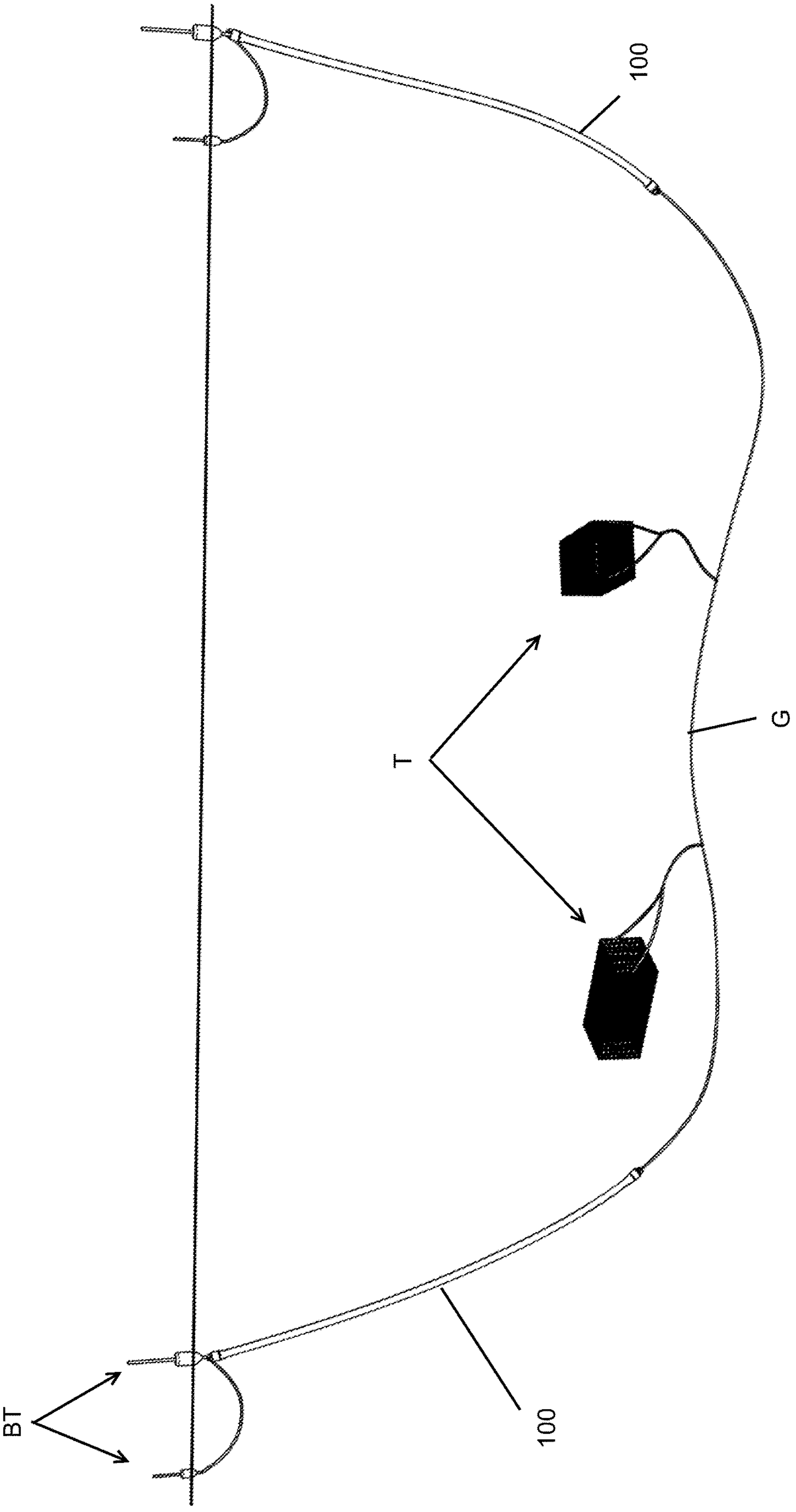
FIG. 1 is a side view illustration of a complete system showing the semi-rigid line connecting.

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

FIGS. 1-4 illustrate a semi-rigid line 100 and system for using the line 100, that is primarily adapted to retrieve items from the floor of a water body. More specifically, the line 100 is designed to allow fishermen to retrieve their traps, such as lobster traps, while also protecting marine mammals from entanglement. As such, in use the line 100 traverses the water column to a buoy at the surface, allowing the retrieval of the gear from the seabed. To protect marine mammals from entanglement yet allow handling by the fishers, the line 100 is configured to have high bending stiffness to limit development of knots and to experience mechanical failure at a bending radius of approximately 0.3 meters, while having a safe coiling diameter of approximately 1.5 meters. In addition to serving as a replacement for vertical trawl lines to reduce entanglement of species that are not groundfish, the composite line and end fitting assemblies may also be used as the connection mechanism between sequential traps along the seafloor.

The semi-rigid line 100 is made of composite material, e.g. fiber-reinforced plastic, and may be any suitable length needed to operate in water of any depth. The composite material itself may be manufactured via pultrusion or extrusion methods, and delivered to the end-user in a long-length coil.

The specific construction of the line 100 may vary slightly depending on particular needs. For dimensional and structural stability during storage while coiled, a Coefficient of Thermal Expansion (CTE) less than or equal to 6.0 E-6/° C., alternatively identified as 6.0×10^-6/° C. or 6.0 μm/m/° C. where ° C. represents degrees Celsius, is desired. The polymer is chosen to have minimal degradation of mechanical properties with prolonged submergence in fresh, brackish, or salt water. Low surface roughness also aids resistance to snagging or knotting, with an average roughness (Ra) of 1.0±0.25 micrometers, as well as lowering friction and abrasion during contact with handling machinery and/or sea creatures. The flexural rigidity is sufficiently low, likely less than 42 Newton meter squared (N-$m^2$) for handling and coiling, with an approximately 1.5 meter safe coil diameter, yet substantially stiffer, likely greater than 8 N-$m^2$, than traditional lines to reduce entanglement risks. The semi rigid line is designed such that it can be manually coiled at 1.5 m diameter safely, and such that bending stresses at this diameter will be significantly lower than those that would cause failure.

The line 100 has a high tensile load capacity, likely greater than 60 kiloNewtons (kN), to support dynamic loads in excess of 40 kN during hauling operations and normal deployment conditions. Depending specifically on the handling characteristics and the required bending stiffness, several options for composite construction exist. For higher stiffness requirements, i.e. having flexural rigidity ~42 N-$m^2$, commercially available pultruded fiberglass (GFRP) rods may be suitable, such as those used as rebar in concrete construction like "TUF-BAR 60 GPa Straight Bar".

On the other hand, for situations where lower bending stiffness, i.e. those having flexural rigidity ~8-10 N-$m^2$, is preferred, a more complex composite rod may be utilized. For example, the composite may have an aramid-vinylester core, and pure vinylester exterior coating. This construction meets the tensile load requirements, while being approximately 35% of the linear mass of the comparable GFRP option. Its minimum bending radius is also considerably lower at 0.1 m which must also be matched to the typical fishing operations in which it is employed and the associated entanglement risks and desired behavior. This construction may be achieved in a two-step pultrusion process, with the aramid core being constructed initially and cured, followed by a thinner application of the neat resin to both protect the aramid fibers from the environment, and reduce the global bending stiffness compared to GFRP for easier handling, while still being appreciably stiffer than traditional ropes and lines.

Upon receipt by the end-user, the composite line 100 may be uncoiled and cut to length, and end termination fittings fitted and/or attached. A variety of terminations are available depending on end-user preference, such as but not limited to custom composite threaded end connections, bonded custom composite end fittings, and traditional metallic cable fittings.

Threaded terminations require custom shouldering fittings to address stress concentrations in tensile and bending loads between the threaded portion of the composite line and the remainder of the line, with the local load transfer between the threads of the joint in compression to the shouldering fitting transferring tensile and bending loads between the line and hardware attached to the termination. Additional features are incorporated to ensure that the threaded joint will not come undone under cyclical light loadings expected during normal deployed conditions, such as locations for lock-wire to be installed. Bonded terminations feature a female socket that forms a clearance fitting over the cut end of the composite rod. After abrading and cleaning both surfaces adequately, a suitable thixotropic adhesive can be used to permanently bond the two components together.

The custom terminations are designed for easy field installation, and utilize material properties as well as geometric features to reduce the likelihood of a creation of a stress concentration at the joint between the composite rod and end fitting. "Traditional" terminations such as crimped fittings and spelter sockets are also suitable but must be evaluated for mechanical compatibility with the composite material being used. The finished connecting line may be coiled and attached to the rest of the trap line assembly. The assembled line and its terminations are compatible with standard crustacean traps and their attachment methods. The trap is deployed in its usual manner, and the line is fully submerged when in use.

Another key component of the invention is the redesigned vessel components that enable fishers to work with the composite lines with minimal interference to typical operations. These primary vessel components are a revised larger diameter, e.g. 1.5 m, winch system that can accommodate reeling the composite line aboard, and a radiused fairlead to redirect the line being hauled, whether composite or traditional, towards the winch without creating stress concentrations.

The fairlead assembly is primarily intended to be a retrofitted fixture onto existing vessels, allowing the large diameter winch to pull the composite line, which is appreciably stiffer in bending than traditional ropes used today, and traps aboard. Where existing trap haulers pull the trawl line directly aboard and the traps hang before being manually pulled aboard and disconnected, the newly designed fairlead also positions the traps for disconnection without manual lifting while also supporting them for more controlled handling. The fairlead's radius of curvature, e.g. 0.75 m, is tuned to produce low bending stresses, i.e. to prevent unintentional failure in the composite line, while also providing enough space to accommodate all traditional trap gear. Alternatively, a system of large diameter, e.g. approximately 1.5 m, rollers placed at the deck edge of the vessel could be used to further alleviate wear on the composite lines.

A roller with a horizontal axis of rotation is inset in the vessel deck while rollers with vertical axes of rotation are fixed on either side of an opening in the vessel topsides at deck level. The opening formed by the rollers is large enough to allow entry of the traps. Made from a high strength, wear resistant and low friction plastic material such as HMPE or Polyoxymethylene, such as Delrin, the rollers or fixed fairlead is resistant to corrosion and prevent wear on the composite line material. The fairlead system can be positioned and oriented either for stern or side-hauling as needed. In cases where the fairlead system is positioned for side-hauling and extends outboard, it is either easily repositionable so as to reduce risk of wave impact during vessel transit, such as in the case of a fixed fairlead as 350 shown in FIG. 5, or sufficiently integrated into the vessel structure, in the case of the large rollers, to withstand wave impacts.

The mechanized winch, which may be electrically and/or hydraulically powered depending on the fishing vessels' systems, has several key features: 1) a large drum diameter (approximately 1.5 m) to reduce the bending stresses imparted on the composite line, 2) features to allow banding of the coiled bundle to restrict the composite line from uncontrolled uncoiling including axially oriented slots in the drum surface, 3) an open or removable end to allow the coiled and banded bundle to be removed or inserted, 4) a fixed framework surrounding the rotating drum which contains the coil once bundling bands have been released and before tension has been applied during deployment, 5) an actuated level wind mechanism which controls the lay of the composite line on the drum, thereby preventing cross-over or self tangling of the composite line during deployment and 6) an integral tether and initial guidance system that allows for the fisher to attach the captured fishing line to the winch, and ensure the buoy and near-surface gear remains accessible.

The level wind mechanism's rotation is tied into the rotation of the drum via internal gearing, and transits the drum's axial direction. The level wind guide bars can be raised as needed to disengage from the composite line, thus allowing easier removal and installation of the coiled and bundled line. This tether keeps the composite line in tension during coiling or uncoiling, thereby preventing the coil from springing open and disrupting the orderly unspooling or coiling of the line during deployment or recovery.

As noted, a primary design criterion for the composite line is the failure during potential marine mammal entanglement events. However, testing and data to support this behavior in all interaction events is not easily achieved given the multitude of potential interaction types. To better control for desirable breaking performance during an interaction, mechanisms can be added to semi-rigid lines or traditional synthetic fiber ropes during deployment. When pressed against a whale body in an entanglement event, a breakaway disk, shown in FIGS. 6 and 7, clamped onto the composite line will help ensure the line, whether semi-rigid or synthetic fiber rope, parts cleanly, freeing the animal without excessive struggle. When the outer edge of the disk is pressed against the body of a marine mammal, and the line is tensioned, rigid wedges on the inside of the breakaway disk located circumferentially around but normally offset from the line, press against the line, causing a stress concentration in the semi rigid rod that will cause the line to experience brittle failure. When applied towards synthetic fiber rope, the wedge on the inner circumferential edge of the breakaway disk takes the form of a sharp cutting edge such that when the breakaway disk is pressed against an animal's body the synthetic rope line is cut. When operating normally (not in contact with curved surface), the cutting edge is held safely offset from the line by flexible bracing material described below.

These breakaway disks would be automatically attached and removed as the line is deployed or recovered. Mechanisms for doing so could be integrated with the specialized fairleads described above. To maintain an orientation perpendicular to the axis of the line, flexible bracing material, such as high density neoprene, would surround the rigid plastic disk, made from HDPE or PVC, in a toroidal shape with a triangular cross section such that the edge pressing against the line is wider than the edge connected to the outer edge of the rigid disk. The entire disk and bracing wedge could be hinged or slotted such that the line can be seated within the hole in the center of the device. Once seated, the device would be clamped shut. These disks would be positioned approximately every 3 m along the length of the line, ensuring that if a large marine mammal were to interact with any part of the line, at least one of these devices would be engaged. The performance of these devices will be a function of the tension applied on the line passing through the device, the curvature of the engaged animal body, and the diameter of the rigid disk. The diameter can be chosen to best suit the morphology of the animals of interest; but will typically range from 0.25 to 0.5 m. The rigidity of the flexible bracing material can be adjusted to best suit the anticipated tensile force and line curvature characteristic of an entanglement event with the animal of interest.

FIG. 1 is an overview diagram of a deployed system that illustrates the use of a conventional buoy and toggle BT, the semi-rigid line 100, a conventional ground line GL, and conventional lobster traps with a bridle and gangion line T. The conventional ground line GL is in the form of rope, such as polyester or nylon rope, such as commercial 3-strand nylon rope.

Figure 3:
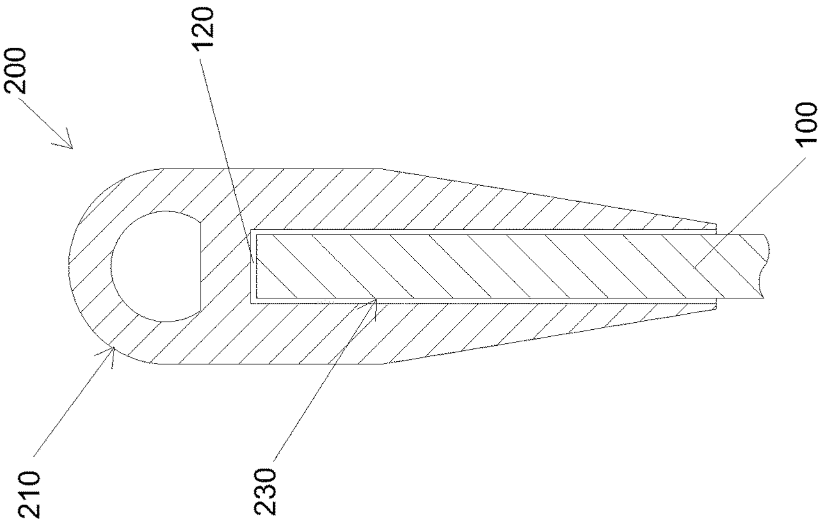
FIG. 3 is a cross-sectional side view of a second termination for use in connecting the semi-rigid line to a trap or buoy.
Figure 2:
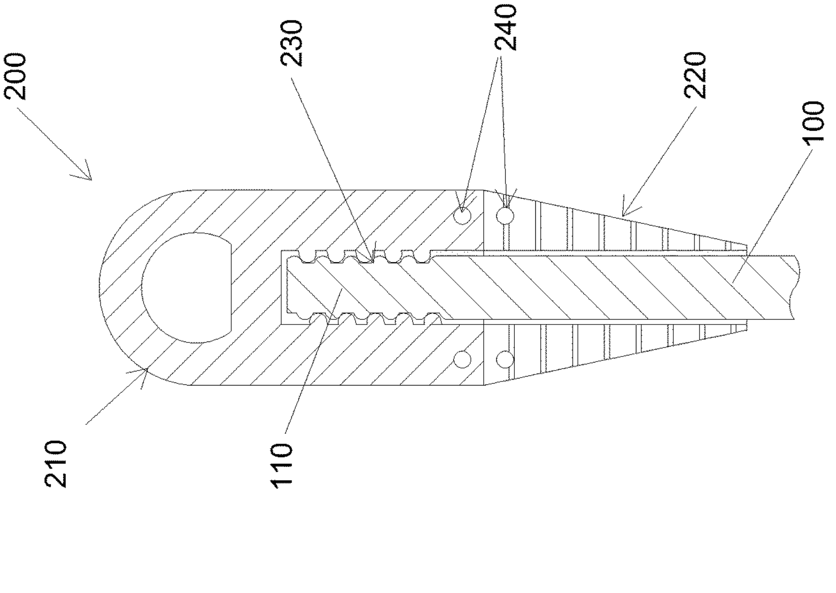
FIG. 2 is a cross-sectional side view of a first termination for use in connecting the semi-rigid line to a trap or buoy.

FIGS. 2 and 3 are cross-sectional illustrations of custom composite terminations 200. FIG. 2 illustrates a termination 200 with a connection eye 210 on an end of the termination 200 that allows for the connection of standard fishing gear. Corresponding pinholes 240 allows the use of a lockwire to prevent the connection eye from unthreading. FIG. 2 also illustrates a shoulder fitting 220 that is bonded to the semi-rigid line 100. When the connection eye 210 is threaded onto the semi-rigid line 100 and mates against the shoulder fitting 220, the threads are isolated from any incidental bending loads during operations or deployment. In the embodiment shown in FIG. 2 an end 110 of the composite line is threaded to work in connection with the connection eye 210. The relatively long and gradual taper of the shoulder fitting 220, coupled with material properties globally similar to the semi-rigid line 100 limit stress concentrations created where the semi-rigid line exits the termination The termination 200 shown in FIG. 3 also includes a connection eye 210, however, rather than having a threaded connection this version includes a internal bore 230 that is abraded and cleaned, after which the semi-rigid line 100 is bonded inside the bore 230. The relatively long and gradual taper, coupled with material properties globally similar to the semi-rigid line 100 limit stress concentrations created where the semi-rigid line exits the termination. The composite line 100 also includes a square cut end 120, and outer surfaces abraded and cleaned prior to bonding to with a suitable adhesive such as, for example, thixotropic methyl methacrylate.

Figure 4:
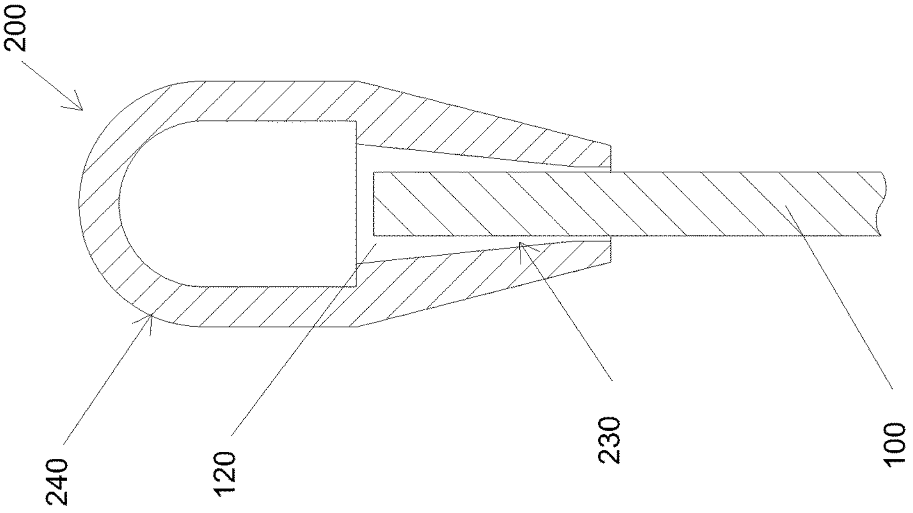
FIG. 4 is a cross-sectional side view of a third termination for use in connecting the semi-rigid line to a trap or buoy.

FIG. 4 shows the termination 200 using a commercial spelter socket 250, which may be bonded similar to the embodiment shown in FIG. 3, though this version may develop higher stress concentrations in bending compared to that shown in FIG. 3 due to the larger taper sizes and differing material properties. Again, the semi-rigid line 100 also includes a square cut end 120, and outer surfaces abraded and cleaned prior to bonding to with a suitable adhesive such as, for example, thixotropic methyl methacrylate.

Figure 5:
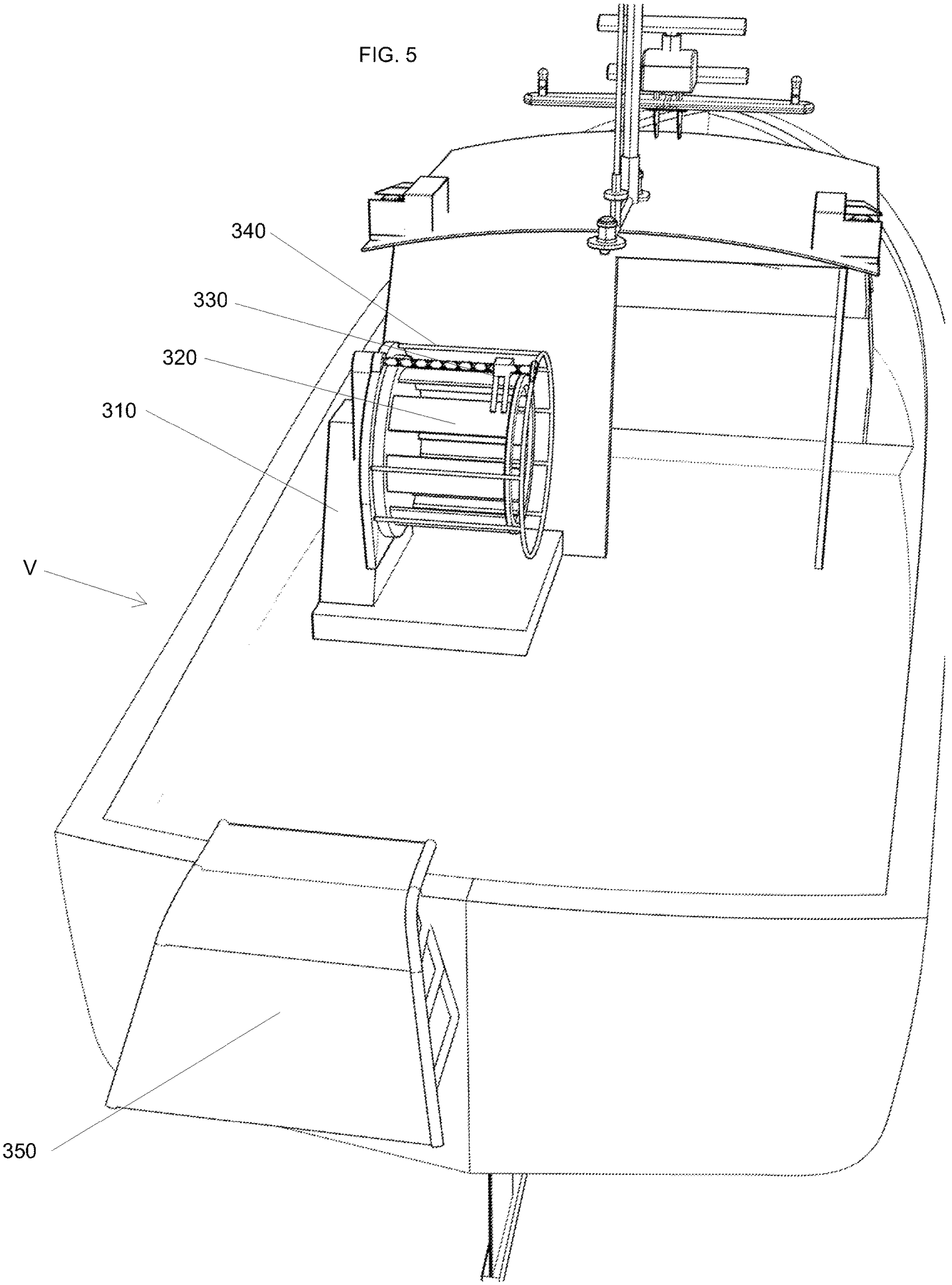
FIG. 5 is a perspective view of a fishing vessel fitted with gear for handling the composite line.

FIG. 5 illustrates hauling equipment 300 that is needed to haul the composite line 100 onto a fishing vessel V. This includes a mechanical winch structural support and machinery housing 310. A slotted winch drum 320, which allows retrieval of the line 100 and banding. A level wind mechanism 330, in the form of bars on an actuated carriage, automatically ensures even laying of the line as it is hauled. The level wind mechanism may be raised out of the way for line removal. An outer cage 340 retains the composite line 100 when tension is released. A fixed, non-rolling, fairlead system 350 is also provided.

Figure 7:
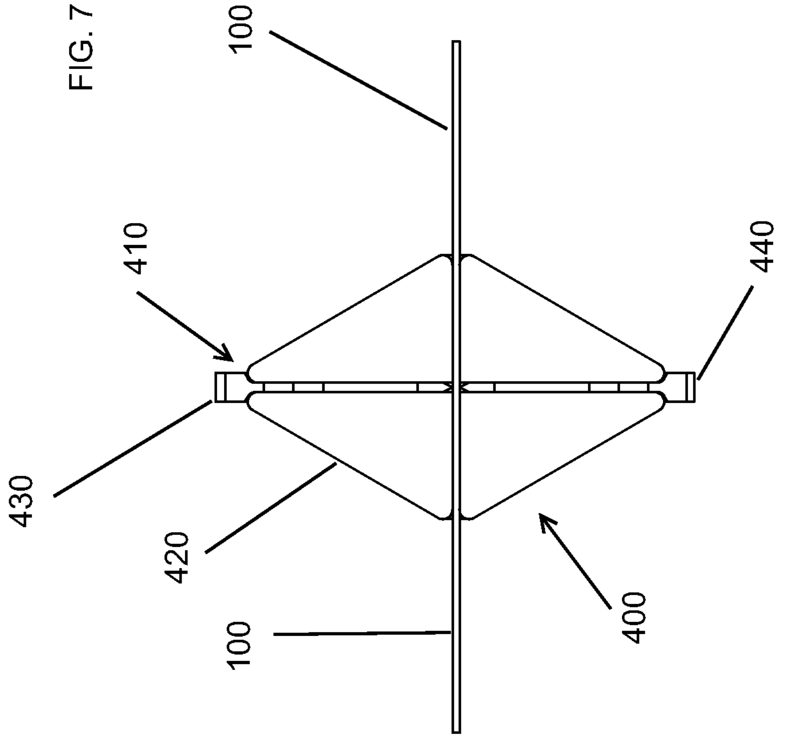
FIG. 7 is a cross sectional view of the device of FIG. 6.
Figure 6:
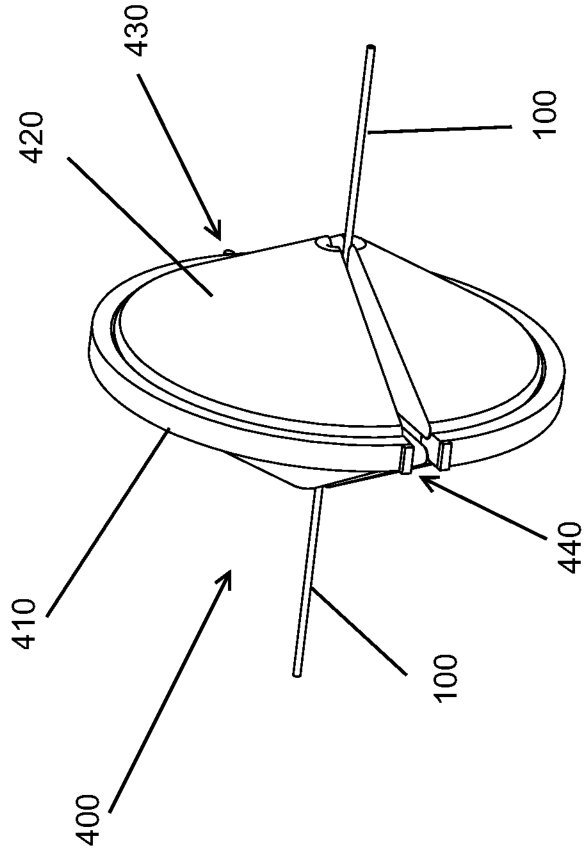
FIG. 6 is a perspective view of a device that increases the likelihood of a clean break during a potential entanglement event.

FIGS. 6 and 7 illustrate a device 400 that increases the likelihood of a clean break during a potential entanglement event. The device 400 includes a rigid plastic disk 410 that transfers force from an animal body to a wedge pressed against the semi-rigid line 100. Bracing 420, that is made of soft material such as neoprene maintains proper orientation of the plastic disc 410 perpendicular to the axis of the semi-rigid line 100 and to prevent movement of the device along the length of the semi-rigid line 100. A hinge 430 and clasp 440 are also to assist in holding the device clamped onto the semi-rigid line 100.

It is understood that the embodiments described herein are merely illustrative of the present invention. Variations in the construction of the semi-rigid line and apparatus may be contemplated by one skilled in the art without limiting the intended scope of the invention herein disclosed and as defined by the following claims.

What is claimed is:

1. A semi-rigid line adapted to retrieve equipment from the floor of a water body, the semi-rigid line comprising:

a composite material that is a fiber-reinforced plastic that is adapted to avoid development of knots and to de-risk entanglement events; and wherein the composite material has a flexural rigidity of between approximately 8 Newtons meter squared and approximately 42 Newtons meter squared.

2. The semi-rigid line of claim 1, wherein the composite material is configured to experience mechanical failure at a bending radius of approximately 0.3 meters.

3. The semi-rigid line of claim 1, the composite material having an approximately 1.5 meter safe coiling diameter.

4. The semi-rigid line of claim 1, wherein the composite material has a aramid-vinylester core and a pure vinylester exterior coating.

5. A semi-rigid line adapted to retrieve equipment from the floor of a water body, the semi-rigid line comprising:

a composite material that is a fiber-reinforced plastic that is adapted to avoid development of knots and to de-risk entanglement events; and wherein the composite material is configured to experience mechanical failure at a bending radius of approximately 0.3 meters.

6. The semi-rigid line of claim 5, wherein the composite material has a flexural rigidity of between approximately 8 Newtons meter squared and approximately 42 Newtons meter squared.

7. A semi-rigid line adapted to retrieve equipment from the floor of a water body, the semi-rigid line comprising:

a composite material that is a fiber-reinforced plastic that is adapted to avoid development of knots and to de-risk entanglement events; and wherein the composite material has a coiling diameter of at least 0.2 meters.

8. The semi-rigid line of claim 7, wherein the composite material is configured to experience mechanical failure at a bending radius of approximately 0.3 meters.

9. The semi-rigid line of claim 7, wherein the composite material has a flexural rigidity of between approximately 8 Newtons meter squared and approximately 42 Newtons meter squared.

10. The semi-rigid line of claim 7, the composite material having a Coefficient of Thermal Expansion of approximately less than or equal to 6.0 E-6/° C.

11. A semi-rigid line adapted to retrieve equipment from the floor of a water body, the semi-rigid line comprising:

a composite material that is a fiber-reinforced plastic that is adapted to avoid development of knots and to de-risk entanglement events; and wherein the composite material has a aramid-vinylester core and a pure vinylester exterior coating.

12. The semi-rigid line of claim 11, wherein the composite material is configured to experience mechanical failure at a bending radius of approximately 0.3 meters.

13. The semi-rigid line of claim 11, wherein the composite material has a flexural rigidity of between approximately 8 Newtons meter squared and approximately 42 Newtons meter squared.

14. The semi-rigid line of claim 11, the composite material having an approximately 1.5 meter coiling diameter.

15. A semi-rigid line adapted to retrieve equipment from the floor of a water body, the semi-rigid line comprising:

a composite material that is a fiber-reinforced plastic that is adapted to avoid development of knots and to de-risk entanglement events; and wherein the composite material has a Coefficient of Thermal Expansion of approximately less than or equal to 6.0 E-6/° C.

* * * * *